United States Patent [19]

Burgess et al.

[11] 3,855,473
[45] Dec. 17, 1974

[54] RADIOACTIVITY MEASURING DEVICE WITH A MOVABLE DETECTOR HEAD

[75] Inventors: John E. Burgess, Arlington Heights; Kenneth C. Dieball, Barrington; Raymond F. Obrycki, Mt. Prospect, all of Ill.

[73] Assignee: G. D. Searle & Co., Chicago, Ill.

[22] Filed: June 4, 1973

[21] Appl. No.: 366,676

Related U.S. Application Data

[63] Continuation of Ser. No. 273,768, July 21, 1972, abandoned.

[52] U.S. Cl. ............................................. 250/328
[51] Int. Cl. ............................................. G01t 7/02
[58] Field of Search ............ 250/327, 328, 367, 494

[56] References Cited
UNITED STATES PATENTS

| 3,168,124 | 2/1965 | Lenkey | 141/284 |
|---|---|---|---|
| 3,271,574 | 9/1966 | Dawson et al. | 250/328 |
| 3,428,805 | 2/1969 | Donato et al. | 250/367 |
| 3,465,145 | 9/1969 | Leiter | 250/327 |
| 3,611,403 | 10/1971 | Gilford | 346/1 |
| 3,654,472 | 4/1972 | Hof et al. | 250/494 |
| 3,722,719 | 3/1973 | Frank | 250/328 X |

OTHER PUBLICATIONS

Automatic Gamma Sample Counter, MTN704-1 LKB Wallac.

Primary Examiner—Archie R. Borchelt
Attorney, Agent, or Firm—Walter C. Ramm; Charles H. Thomas, Jr.; Peter J. Sgarbossa

[57] ABSTRACT

A radioactivity measuring device having a movable detector head for use in measuring the level of radioactivity in a multiplicity of discrete samples. The samples depend in a lateral array from a sample bearing means in a mounting frame, and the detector head undergoes translational motion to traverse the lateral array. The detector head moves vertically between a raised position for measuring radioactivity in samples, and a lowered position, for lateral movement beneath the array of samples. The detector head may accommodate simultaneously a plurality of samples for concurrent measurement, and the samples may be arranged in trays having a unique identification.

22 Claims, 12 Drawing Figures

3,855,473

RADIOACTIVITY MEASURING DEVICE WITH A MOVABLE DETECTOR HEAD

This is a continuation of application Ser. No. 273,768, filed July 21, 1972, now abandoned.

This invention relates to a radioactivity measuring device for handling a large volume of discrete samples for measurement either singly or in replicate.

BACKGROUND OF THE INVENTION

In conventional radioactivity measuring systems for handling a multiplicity of samples, samples are generally arranged at sequential positions in a closed loop conveying apparatus. Examples of such systems are described in U.S. Pat. Nos. 3,206,006; 3,604,935; and 3,553,454. One common disadvantage of all of these systems is the limitation on sample handling capacity inherent in a system which requires a conveyor mechanism for moving a chain of samples one by one past a sample measuring station. Because of the space occupied by the conveyor links and the conveyor sprockets for guiding the movement of the chain, a great deal of space in the plane of sample movement is unavailable for occupancy by samples to be measured.

In particular applications, such as radioimmunoassay, the number of samples to be tested may be significantly greater than in other typical applications. In these instances the sample handling capacity of radioactivity measuring devices becomes particularly critical.

A related aspect of the problem of sample handling capability is the size of the unit required considering the number of samples in the batch of samples to be handled. The unique basis of operation of the present invention allows more than twice as many samples to be processed in a batch than is presently possible with the largest existing commercial unit utilizing a console that occupies less floor space than the same conventional commercial unit.

SUMMARY OF THE INVENTION

It is an object of the present invention to provide a radioactivity measuring device having a much larger sample handling capacity than is possible with existing devices. The unit of this invention has the ability to handle large batches of samples and test tubes arranged in trays, which arrangement is particularly compatible with other operations in connection with radioimmunoassay.

Furthermore, it is an object to increase the amount of throughput of samples through a radioactivity measuring device while at the same time minimizing required operator attention. This objective is achieved through the unique construction of the radioactivity measuring device and the unique interaction of the parts thereof.

Furthermore, the present invention in its preferred form is designed to concurrently process replicate samples, and to automatically provide an output of the data and data analysis of samples measured in replicate. To achieve this object, the system for replicate measurement and concurrent data analysis described in application Ser. No. 237,662, filed Mar. 24, 1972 is utilized.

A further object of the invention is to provide a low cost sample identification system while at the same time eliminating the expensive Geneva switches which characterize the sample identification systems of conventional radioactivity measuring devices. Sample identification is achieved by means of a braille tray identification system, which, when correlated with the sample position in the particular tray of interest, uniquely identifies each sample in the sample array.

In a broad aspect, this invention is in a radiation measuring device for measuring a multiplicity of separate radioactive samples and employing a frame for supporting a multiplicity of samples, a scintillator in a sample measuring chamber, a photodetector in optical communication with said scintillator, and pulse processing means electrically connected to said photodetector, the improvement comprising sample bearing means for supporting said samples with said samples at least partially suspended therefrom at fixed locations in a lateral array, and a movable detector head defining at least one sample measuring chamber in said detector head with a passageway in said detector head leading to each such measuring chamber, and a translation inducing means for moving said detector head vertically between a lowered position below said samples and a raised position in which a portion of at least one sample extends through a passageway into a measuring chamber, and for moving said detector head in the lowered position laterally beneath said samples to traverse the aforesaid array.

In another aspect this invention is a radiation measuring device for measuring radioactivity of a multiplicity of discrete samples comprising: a mounting frame; sample bearing means supported by said mounting frame for positioning a multiplicity of discrete samples at predetermined intervals from each other in a lateral array with samples depending from said sample bearing means; a detector head containing at least one photodetector that generates electrical pulses of energy proportional to the energy in scintillations received, protected by a shielding means that defines an aperture extending proximate to each photodetector; translation inducing means coupled to said detector head for moving said detector head laterally beneath the aforesaid samples to transverse the aforesaid array of samples and for moving the detector head vertically alternately between a lowered position located beneath the aforesaid samples and a raised position with a substantial portion of at least one depending sample extending into one of the aforesaid apertures in said shielding means proximate to a photodetector; a scintillator sensitive to radioactive events located proximate to said photodetector and to samples extending into said apertures when said detector head is in the aforesaid raised position; and pulse counting means connected to said photodetectors for receiving and tabulating pulses generated as a result of radioactive events occurring in the samples extending into said apertures in the shielding of said detector head.

DETAILED DESCRIPTION

Figure 1:
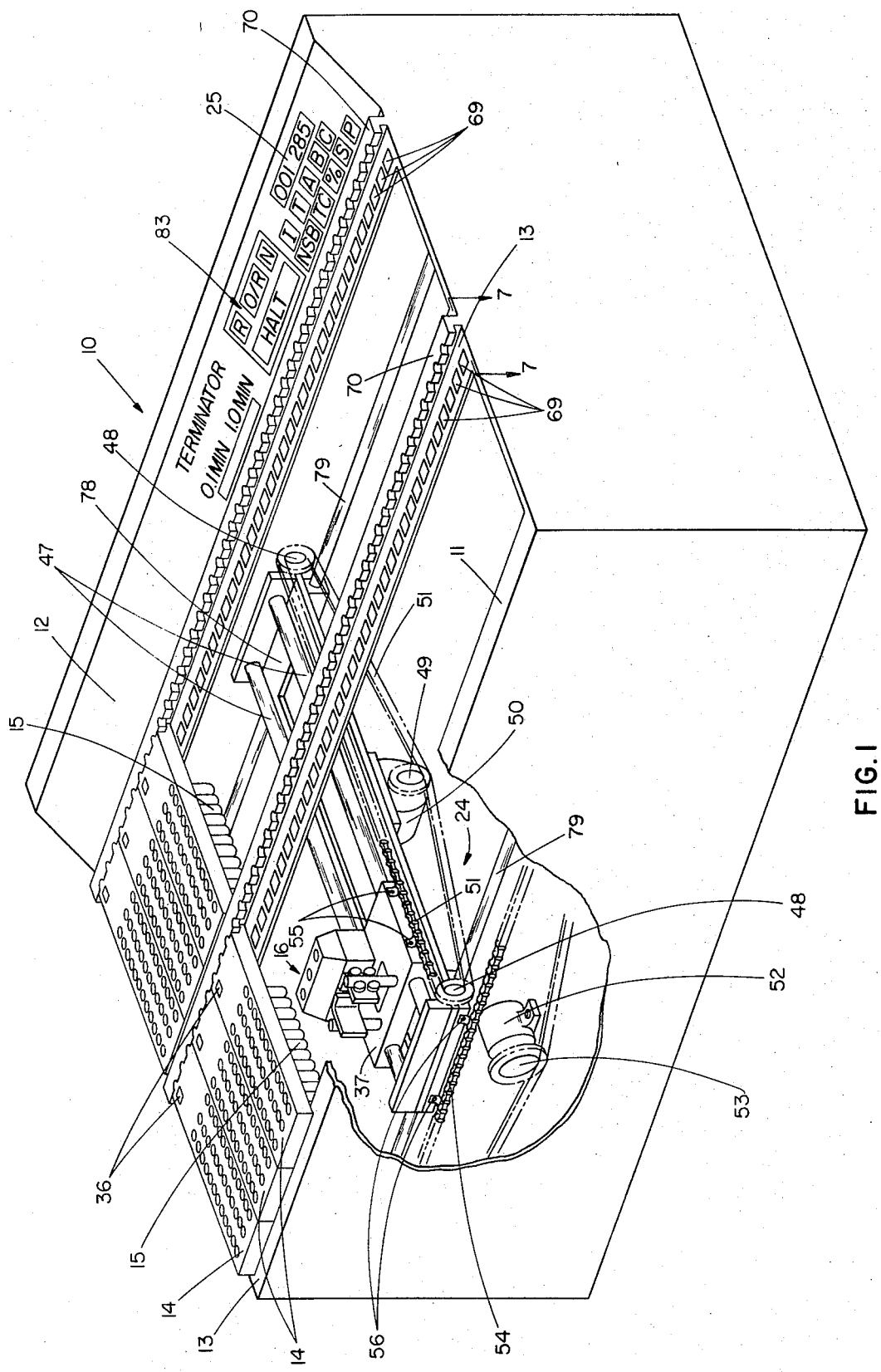
FIG. 1 is a perspective view of the console of the radioactivity measuring device of this invention.

Referring now to FIG. 1, the radioactivity measuring device 10 for measuring radioactivity of a multiplicity of separate or discrete samples is depicted as a floor standing unit. The device 10 is comprised of a mounting frame 13 with sample bearing means in the form of a plurality of removable trays 14 supported by the mounting frame 13. A multiplicity of discrete samples 15 are positioned at predetermined intervals from each other in a lateral array depending from the trays 14. The samples 15, (which term is understood to include both the physical container, usually a glass or plastic test tube, as well as the contents thereof) are each supported at fixed locations in a lateral array by the trays 14, with a substantial portion of the tubes 15 suspended from the trays 14.

While the samples remain in a stationary lateral array depending from the trays 14, a movable detector head 16 moves laterally beneath the samples 15 to traverse the array of samples. The detector head 16 is driven in one lateral direction by a motor 52 driving a sprocket 53 that engages a chain 54. The chain 54 is attached by specially adapted links 56 to a movable detector bed 78 that slides along longitudinal guide rails 79. Sprockets (not shown) at opposite ends of the radiation measuring device maintain tension in the chain 54.

A detector head platform 37 travels along guide rails 47 disposed at right angles to the guide rails 79, and extending through passageways 38 (FIG. 3) in platform 37. The movement of the detector head platform 37 along guide rails 47 is controlled by the electric motor 50 which drives the chain 51 by means of the drive sprocket 49. Sprockets 48 maintain tension in the chain 51, and specially adapted links 55 in the chain 51 attach the platform 37 to the chain 51.

Figure 3:
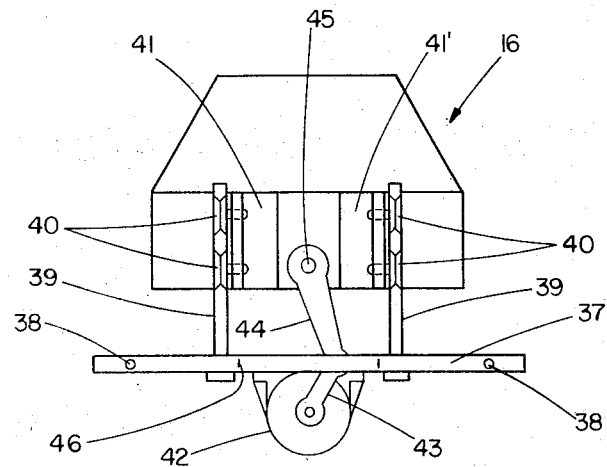
FIG. 3 is an enlarged elevational view of the detector head and the associated operating components and supports.

Vertical motion of the detector head 16 is best illustrated in FIGS. 1 and 3. An electric motor 42, operates through crank arm 43 to drive a connecting link 44 which is privotally attached to the pin 45 extending outward from the detector head 16. The vertical motion of detector head 16 is maintained through the use of guide rods 39 extending vertically upward from platform 37. Rollers 40 are attached by means of axle pins to flanges 41 and 41' which extend outward from detector head 16. The detector head 16 moves vertically in a reciprocating manner between a raised position and a lowered position as the crank arm 43 rotates. A wide aperture 46 exists in the platform 37 to accommodate the movement of crank arm 43 and connecting link 44. The motor 42 is fastened to the underside of platform 37 behind the aperture 46 as viewed in FIG. 3.

The motors 42, 50, and 52, together with the cooperating driving and guiding elements described thus far, form a translation inducing means 24. Translation inducing means 24 is coupled to the detector head 16 for moving the detector head 16 laterally beneath the samples 15 to traverse the array of samples in the trays 14. The translation inducing means also moves the detector head vertically alternately between a lowered position located beneath the samples 15, and a raised position with a substantial portion of at least one depending sample 15 extending into the detector head 16 if any samples are present at the particular sample position.

Figure 2:
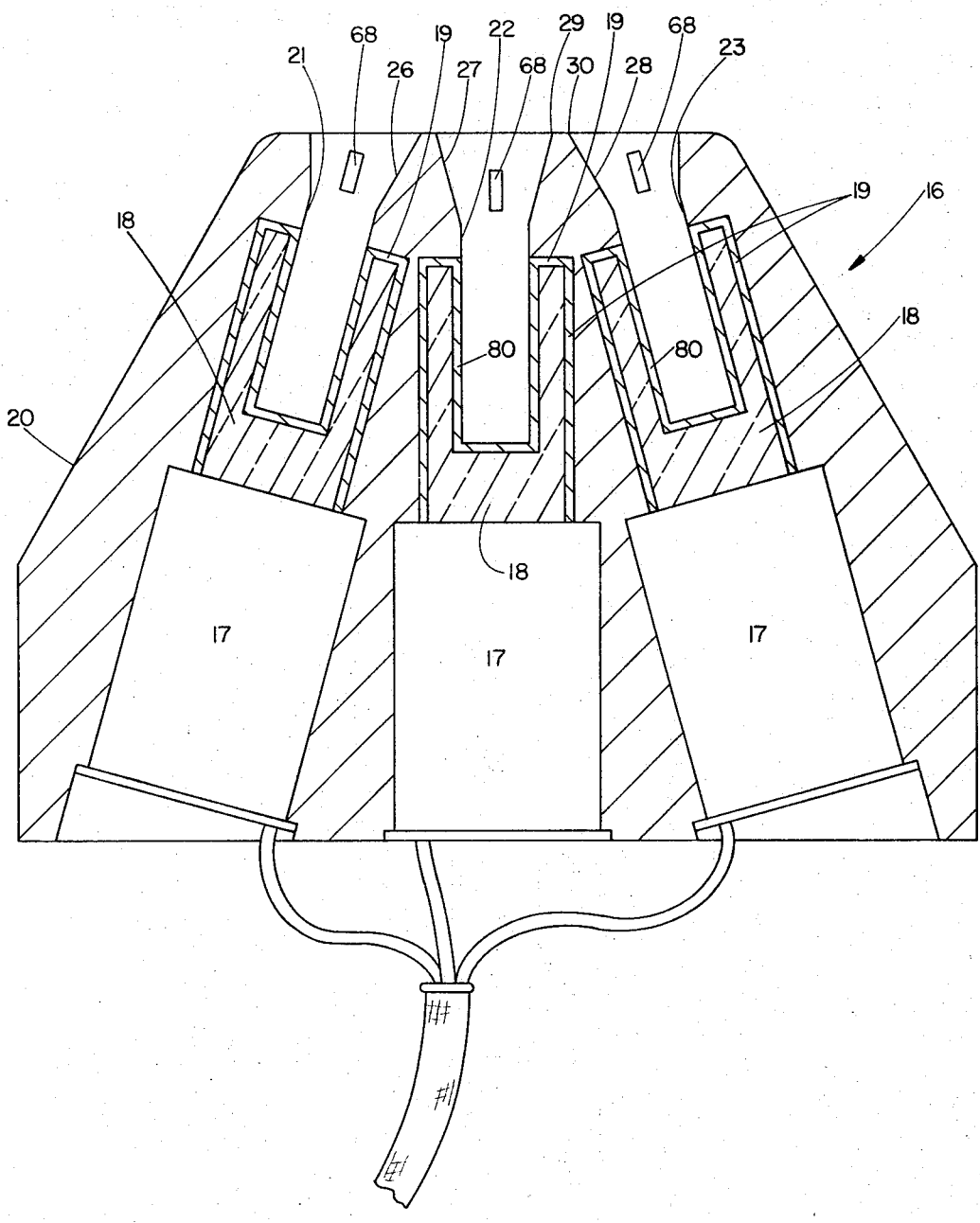
FIG. 2 is a magnified sectional view of the detector head.

Referring now to FIG. 2, it can be seen that the detector head illustrated contains three photodetectors 17, typically conventional photomultiplier tubes, that generate electrical pulses of energy. These pulses of electrical energy are proportional to the energy in scintillations received by each photodetector from a proximately located scintillation crystal 18. The scintillation crystals are conventional crystals of thallium activated sodium iodide protected by aluminum shields 80. Each crystal 18 is formed with a cup-like cavity that serves as a sample measuring chamber. Access to the measuring chambers is by way of the passageways or apertures 21, 22, and 23 formed in the shielding 20 in the detector head 16. The photodetectors 17 are surrounded and protected by a lead shielding means 20 that defines the three apertures, or passageways, 21, 22, and 23, which extend into the detector head proximate to each photodetector. Aperture 22 is a central vertically aligned passageway communicating with a central photodetector 17. On either side, the flanking apertures 21 and 23 extend into the detector head to companion photodetectors 17 preferably at an angle no greater than 15° with respect to the axis of the central aperture 22. In the embodiment illustrated, the angle of inclination is approximately 15°. Each aperture is provided with a mouth that flares outward at the surface of the detector head 16, such that the lateral distance between the closest edges of adjacent apertures, such as edges 29 and 30, at the surface of the photodetector head is no greater than the distance D in FIG. 4, which is the distance between the center lines of adjacent samples which are concurrently measured. In this way the flared mouths 26, 27, and 28 respectively associated with passageways 21, 22, and 23, guide the samples into the aperture associated therewith as the detector head 16 moves from a lowered to a raised position.

Figure 6:
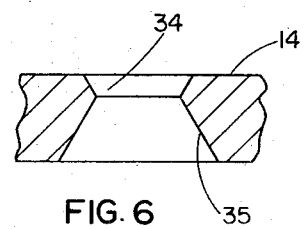
FIG. 6 is an enlarged sectional view taken along the lines 6—6 of FIG. 4.
Figure 9:
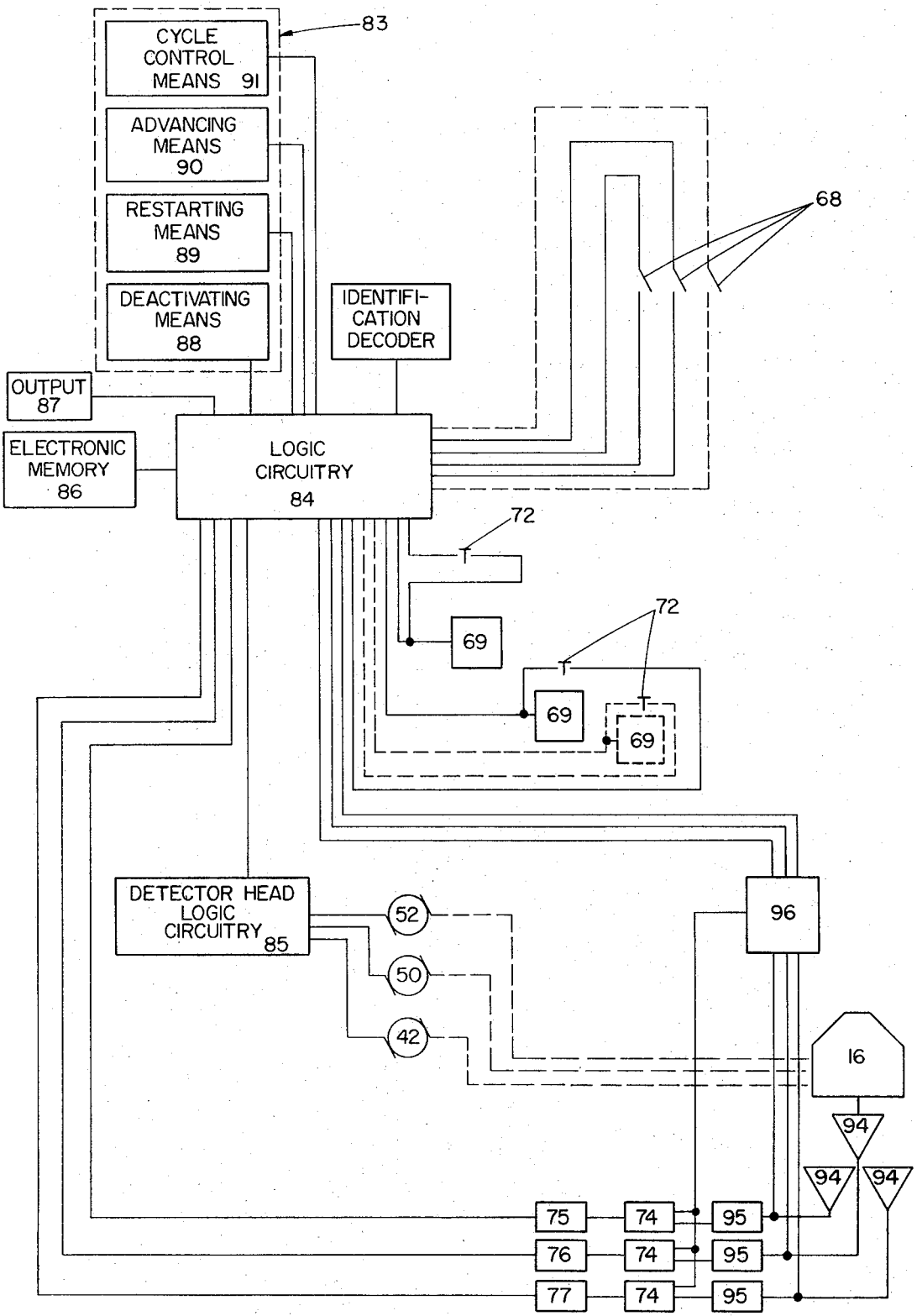
FIG. 9 is a block diagram of the electrical circuitry of the radioactivity measuring device.

The removable trays 14 are illustrated as defining a rectangular matrix of circular openings. The openings are arranged in rows spaced a first uniform distance S apart, and in columns spaced a second uniform distance D apart. As illustrated in FIG. 6, the openings, such as openings 34 increase in diameter in proceeding from the upper side to the underside of the tray 14, throughout a substantial portion of the thickness of the tray, as indicated in the area 35. In this manner, samples 15 positioned in the openings and depending from the tray may be inclined at an angle with respect to the vertical. As the detector head moves from the lower position to the raised position the mouths 26, 27, and 28 respectively of the aperture 21, 22, and 23 engage the samples 15 which are suspended from the next to last row of the tray 14, the apertures 21 and 23 cause the samples 15 depending from the apertures 32 and 32'' to tilt so as to position the samples 15 in the measuring chambers. This tilting is allowed by reason of the configuration of the apertures illustrated in FIG. 6. As the detector head 16 rises, any samples depending from the openings in the tray 14 trip a microswitch 68 in each aperture in the detector head. Detector head logic circuitry 85, as illustrated in FIG. 9, may be programmed to operate only upon the actuation of one or any combination of the switches 68, depending upon whether or not or the manner in which replicate samples are utilized in a particular measurement. If the requisite combination of switches 68 is actuated, the logic circuitry 84 of the device begins counting radioactive events for a predetermined time, or for a period of time until a predetermined number of events have been counted. If an incorrect combination of switches 68 is actuated, by reason of the presence of a greater or smaller number of samples 15 than are required, the detector head logic circuitry 85 will operate the translation inducing means 24 to return the detector head 16 to the lowered position, and to index the detector head 16 to the next sequential sample position, such as the last row below the openings 31, 31' and 31''. This action will be repeated whenever the sample sensing switches 68 in the detector head 16 fail to detect a sample when the detector head 16 reaches the raised position.

The removable trays 14, (FIG. 4) are located at predetermined adjacent tray positions in the mounting frame 13 (FIG. 1). These predetermined positions are determined by the positioning protuberances 81 and by the undercutting lip 82 of each tray which respectively fit into notches and the gaps beneath the projections in the positioning rails 70. Each tray has an identification means 36 whereby a unique identification may be assigned to each tray. By determining the sample position within a tray, a unique identification may be associated with each sample.

Figure 7:
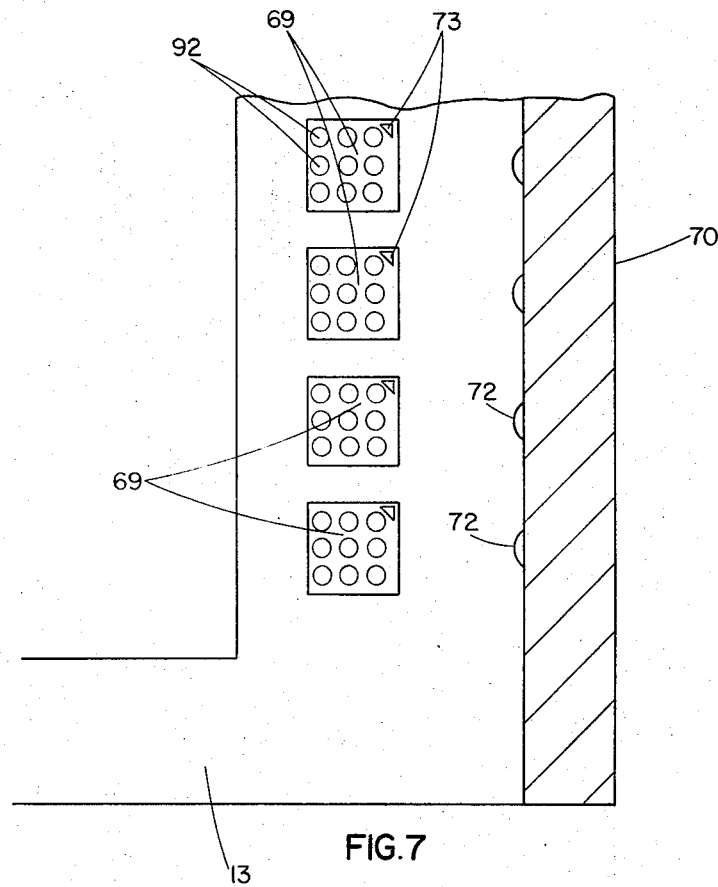
FIG. 7 is an enlarged plan view of the portion of the radioactivity measuring device indicated at the lines 7—7 in FIG. 1.
Figure 4:
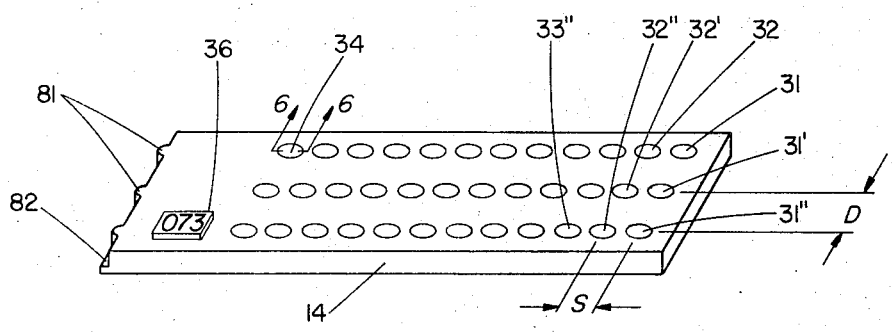
FIG. 4 is a perspective view of one embodiment of a tray utilized in the radioactivity measuring device of this invention.
Figure 11:
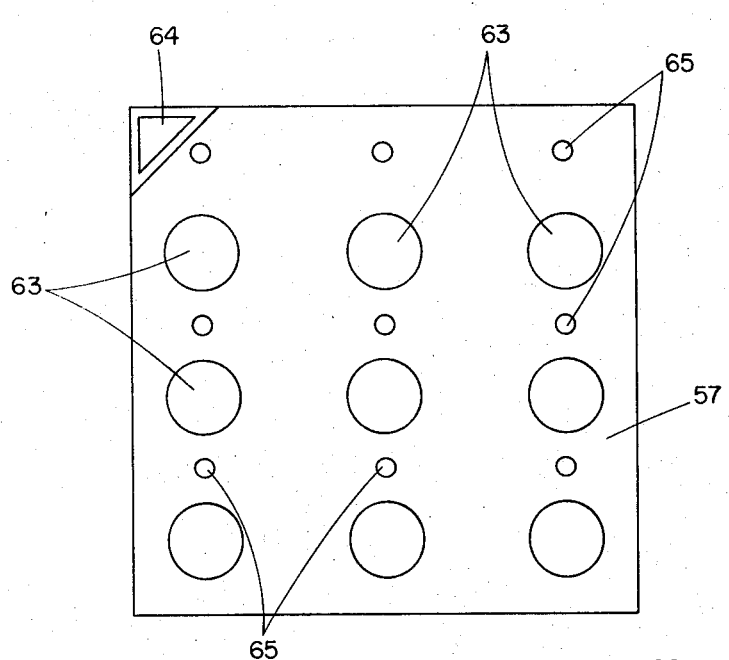
FIG. 11 is an isolated plan view of a component element of FIG. 10.
Figure 12:
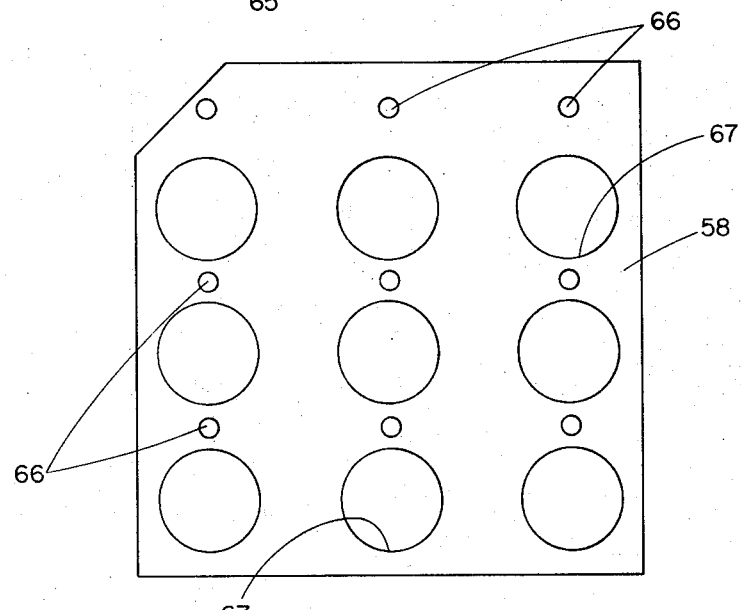
FIG. 12 is an isolated plan view of another component element of FIG. 10.
Figure 10:
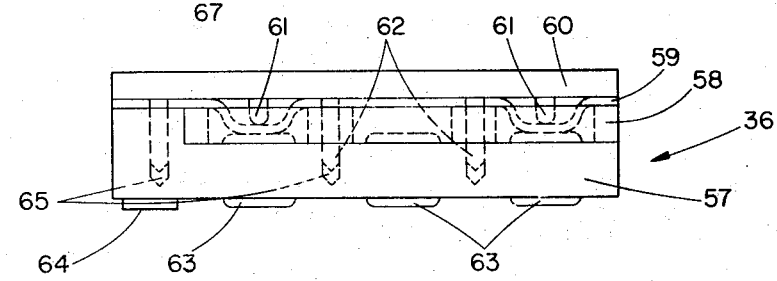
FIG. 10 is an elevational view of the tray identification means of FIG. 4.

The identification means 36 has an identification coded in both machine readable form and in alphameric form as indicated in FIG. 4. The coding in machine readable form is formed by a plurality of electrical contacts extending to the underside of each of the trays 14. As illustrated in FIGS. 10, 11, and 12, combinations of those electrical contacts 63 which are energized provide a unique machine readable code for identifying each tray. This code is read by the logic circuitry 84 of the radiation measuring device through the mating contacts 92 of the mating terminal blocks 69 in frame 13 (FIG. 7). As illustrated in FIG. 10, the identification means 36 has electrical contacts 63 which extend through a tray terminal block 57. In addition, the identification means 36 has a conductive elastomeric overlay sheet 59 which is formed from a dispersion of precious metal particles in a silicone rubber binder. An electrically insulating sheet 58 with perforations 66 and 67 is interposed between the conductive overlay sheet 59 and the tray contact terminal block 57. A pressure block 60 with a unique pattern of protrusions 61 extending perpendicular thereto is forced down against the overlay sheet 59. Where the protrusions 61 contact the overlay sheet, they deform the overlay sheet 59 to fit into the perforations 67 in the insulating sheet 58. The electrically conductive overlay sheet 59 is thereby brought into direct contact with specific ones of the electrical contacts 63 in the tray terminal block 57. Electrical circuits are formed from the voltage source contact 73 of the mating terminal block 69, through the base contact 64 in terminal block 57, then through the overlay sheet 59 to the specific ones of the electrical contacts 63 which are in contact with the overlay shet 59 because of the pressure from the protrusions 61. The circuits are completed from the energized contacts 63 to the respective mating contacts 92 in the mating terminal block 69. It can be seen that pressure at selected locations on the conductive overlay sheet 59 adjacent to the perforations 67 in the insulating sheet 58 locally deform the overlay sheet 59 to energize electrical circuits through a selected unique combination of electrical contacts 63, thereby providing a unique signal of tray identity. The pressure sustaining block 60 for maintaining localized deformation in the overlay sheet 59 is secured in place by means of the pins 62 which extend through apertures 66 in insulating sheet 58 and into the wells 65 in the tray terminal block 57. Pins 62 are held by friction in the wells 65. The identification on the trays may thereby easily be changed by removing the pressure sustaining block 60 and by replacing it with another pressure sustaining block 60 that has a different pattern of protrusions.

Radiation measuring device 10 is further equipped with tray sensor means in the form of push button switches 72 (FIG. 7). The push button switches 72 are connected to the logic circuitry 84 of the radiation measuring device 10. Upon activation of the tray sensor switches 72 by pressure of the undercutting lip 82 against the switches, the presence or absence of a tray at a particular position of interest in the positioning rail 70 of the mounting frame 13 is determined. The logic circuitry 84 directs the detecting head 16 to proceed with sample measurement at a position of interest along the positioning rail 70 when the presence of a tray is detected at that position. Conversely, the logic circuitry 84 directs the detector head logic circuitry 85 to activate the motor 52 or the motors 52 and 50 to advance the detector head 16 to the next tray position upon the positioning rails 70 upon the failure to detect the presence of a tray at a position of interest when the appropriate tray sensor switches 72 are not closed.

It should be noted that the tray sensor switches 72 and the mating terminal block 69 cooperate together in their input to the logic circuitry 84 to operate as a tray width detecting means. There is a mating terminal block 69 on the mounting frame 13 for every column position in which samples might be present in a tray. For example, in the tray 14 in FIG. 4, the tray identification means 36 heads the first column position, which column position includes the openings 31'', 32'', 33'' etc. A second column position includes the openings 31', 32', and so forth. Similarly, the third column position includes the openings 31, 32, and so forth through opening 34.

Figure 5:
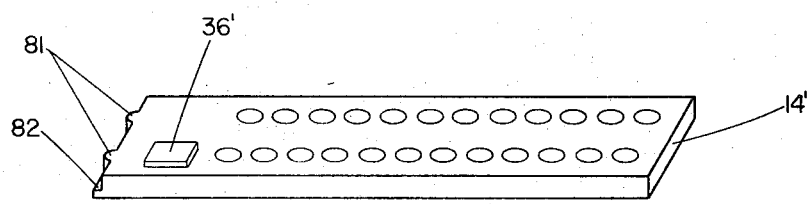
FIG. 5 is a perspective view of an alternative tray embodiment.

The tray identification means 36' of tray 14' in FIG. 5 is likewise located in front of the first column position.

When a tray 14 is positioned on the mounting frame 13 with the undercutting lip 82 and the protrusions 81 seated in the positioning rail 70, the concurrent activation of the electrical contacts 64 and 73 along with the actuation of the switch 72 associated with the particular mating terminal block 69 at which the electrical contact between contacts 64 and 73 exists, identifies the particular column position involved as the first column in a tray. Moreover, the closing of the tray sensor switches 72 associated with the other columns of the tray, without the making of any electrical circuits from the mating terminal blocks 69 associated therewith, signals to the logic circuitry 84 the presence of a tray three columns in width at the column positions of interest. If a tray 14' is positioned next to a tray 14, the concurrent closing of the tray sensor switch 72 and the making of an electrical circuit between the contacts 64 and 73 in the terminal block associated with the first column position signals the existance of an adjacent tray. Since the tray 14' is only two columns wide, only the single adjacent tray sensor switch 72 will be closed without any corresponding electrical contacts existing in a mating terminal block 69 associated therewith. If no tray at all is positioned in the column positions of interest, no actuated contacts will exist at the associated terminal block 69, and the associated tray sensor switch 72 will also be open. From this transmitted information, the logic circuitry 84 can determine the location of the first column position of each tray and the width of each tray. Upon commands from the logic circuitry 84, the detector head logic circuitry 85, through motor 52, adjusts the distance of lateral movement of the detector head perpendicular to the columns in the trays in indexing the detector head. If can be seen that this movement is governed by the tray width as determined by the tray width detecting means. It can also be seen that trays having any different numbers of columns may be positioned in the mounting frame 13.

Figure 8:
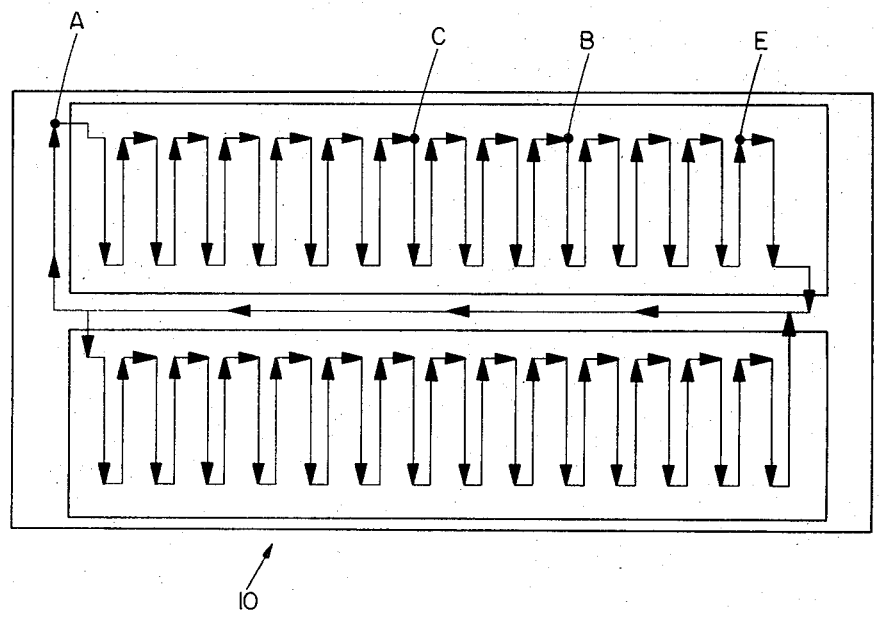
FIG. 8 is a plan view diagramatically illustrating the movement of the detector head.

FIG. 8 illustrates the lateral movement of the detector head 16 in a radiation measuring device 10 in which trays 14 are present in all of the column positions. The trays are mounted in two sections along one of the two tray positioning rails 70, and remain fixed in place in the counter. The tray identification reader will index from left to right, in the rear group first. Motion parallel to the guide bars 79 will be controlled by the precision chain drive as powered by the motor 52, which has previously been described. Limit switches will define the end of each tray section. When commanded to index to the next tray, motor 52 will advance to a position determined by the tray sensor means. The tray identification means 36, the mating terminal blocks 69, and the tray sensor switches 72 will determine whether the tray contains two or three columns of tubes. Fine positioning in the direction parallel to the guide bars 79 will be determined by the cam switch sensing rotation of the drive shaft (not shown) on the motor 52. The mechanism for moving the detector head laterally to positions beneath the rows on the tray will be controlled by the drive of the motor 50 through the chain 51 as previously described. The detector head bed 78 will contain switch-sensed notches for stop positions, and switch-sensed coded row identification contacts. The motor 50 will, in the preferred embodiment, cause indexing of the detector head to each row position when a tray is present whether samples 15 are present in the row or not. At each row, the detector head 16 will be raised approximately 3 inches to bottom the samples 15 in the passageways in the detector head 16. As has previously been described, the failure to activate the programmed combination of microswitches 68 will cause immediate reversal of the vertical drive and cause indexing to the next tray row. In the preferred embodiments, each tray will contain two or three columns and twelve rows. In each of the two tray group sections on the mounting frame 13, there will be 52 column positions or a total of 104 column positions in the entire radiation measuring device 10. When a tray section is filled entirely with three-column trays, such as in FIG. 8, each section will accommodate a total of 14 trays. The radiation measuring device 10 thereby accommodates as many as 1008 samples at one time for analysis by radiation measurement.

Preferably, the radiation device is dedicated to the detection of a single radioisotope, such as iodine 125. In the application of the invention to radioimmunoassay, typically a quantity of iodine 125 is present as the radioactive substance of interest in each of the discrete samples 15. In the use of the radiation measuring device for radioimmuncassay, the trays include reference trays containing reference standard samples. The characterization of a tray as a "standard" tray, or tray containing reference standards, is signalled by the tray identification means. The samples in the standard trays are measured first, followed by the unknown sample trays. The reference standard sample trays are therefore positioned ahead of the unknown sample trays in the detector head path illustrated in FIG. 8.

The radiation detecting device 10 includes operating controls 83 which are activated by the push buttons or keys illustrated in FIG. 1. The operating controls interact electrically with the other electrical portions of the system as illustrated in FIG. 9. The operating controls have deactivating means 88 for halting sample measurement and, with the assistance of the logic circuitry 84, for storing in electronic memory 86 the results of sample measurement of at least the reference samples in at least the last reference standard sample tray analyzed. Disabling the deactivating means causes the radiation measuring device to resume sample measurement with an output based on the stored measurements of the last reference, sample tray. For example, if the detector head were deactivated while measuring samples in a row in a tray position indicated at B in FIG. 8, and if the last prior standard tray were at the tray position indicated at C, the measurements of the standard samples from tray position C would be stored in electronic memory 86. When reactivated, the device would resume measuring where it had left off.

The operating controls 83 also include a restarting means 89 for returning the detector head to the last previous reference standard sample tray, and thereupon resuming reference ane unknown sample measurement. Continuing the example previously recited, if the deactivating means were operated while the detector head 16 were located in tray position B, and the restarting means 89 were subsequently actuated, the detector head 16 would reverse its normal direction of lateral motion and proceed to the first row position in column C. Thereupon it would proceed to measure samples in its normal forward sequence, basing the measurements of unknown samples on the new measurements received from the samples in the reference standard tray.

The control means 83 is equipped with an advancing means 90, which, when activated, advances the detector head 16 to the next reference standard tray. Continuing the previous example, if the next subsequent reference standard tray were at the position indicated by E, operation of the deactivating means 88 following by operation of the advancing means 90 would cause the detector head to cease measurement in tray position B, and to advance to tray position E.

The operating controls also include a cycle control means 91 for recycling the translation inducing means 24 to cause the detector head 16 to automatically and repeatedly traverse the array of samples. Alternatively, the cycle control means might be operated to disable the translation inducing means 24 to cause the detector head 16 to cease all motion after traversing the array of samples a single time.

In a typical operation of the radiation measuring device 10, radioactive events are detected by the scintillators 18 in the detector head 16. The scintillators 18 emit flashes of light to the photodetectors 17, which in turn generate electrical pulses proportional to the energy received. The electrical pulses from the photodetectors 17 are amplified by amplifiers 94 and are passed through pulse height discrimination windows 95, normally set at from between 15 to 100 kev. A background count rate registered in the background subtracting means 96 from logic circuitry 84 is automatically subtracted, by means of correcting devices 74, from the qualifying electrical pulses which pass through the pulse discriminators 95. Also, other corrections are made in the correcting devices 74. Typical of such corrections is the correction for non-specific binding of the radioisotope of interest in a sample tube in radioimmunoassay. The adjusted counts of qualifying pulses are registered in the pulse count registers 75, 76, and 77, which may be any of the numerous conventional pulse counting means. Typically, the adjusted pulse counts are also passed to the logic circuitry 84 which they are tabulated and where comparative computations are made based on the reference samples from the standard trays, as described in application Ser. No. 237,662, filed on Mar. 24, 1972.

The logic circuitry will typically produce both a temporary visual output indicating adjusted pulse counts, such as that at the indicator 25 in FIG. 1, and a permanent output in the form of a hard copy printout from a conventional teletype machine. The model 33 or 35 KSR teletype manufactured by the Teletype Corporation is a suitable device for this purpose.

The detector head of this invention is typically used for the dedicated counting if iodine 125 only. However, optional counting windows will permit counting of other low energy gamma emitting isotopes, such as technetium 99m and cobalt 57.

The above description and explanation of a preferred embodiment of this invention is given by way of example only, and numerous modifications can be made by those skilled in the field of radiation measurement without departing from the scope of this invention as defined in the claims.

We claim:

1. A radiation measuring device for measuring radioactivity of a multiplicity of discrete samples comprising:
    a. a mounting frame,
    b. sample bearing means supported by said mounting frame for positioning a multiplicity of discrete samples at predetermined intervals from each other in a lateral array with samples depending from said sample bearing means,
    c. a detector head containing at least one photodetector that generates electrical pulses of energy proportional to the energy in scintillations received, protected by a shielding means that defines an aperture extending proximate to each photodetector,
    d. translation inducing means coupled to said detector head for moving said detector head laterally beneath the aforesaid samples to traverse the aforesaid array of samples and for moving the detector head vertically alternately between a lowered position located beneath the aforesaid samples and a raised position with a substantial portion of at least one depending sample extending into one of the aforesaid apertures in said shielding means proximate to a photodetector,
    e. a scintillator sensitive to radioactive events located proximate to said photodetector and to samples extending into said apertures when said detector head is in the aforesaid raised position, and
    f. pulse counting means connected to said photodetectors for receiving and tabulating pulses generated as a result of radioactive events occurring in the samples extending into said apertures in the shielding of said detector head.

2. The device of claim 1 wherein said scintillator is a scintillation crystal positioned between a photodetector and a sample that extends into an aperture in the photodetector head when said photodetector head is in the raised position.

3. The device of claim 1 wherein said sample bearing means is comprised of a plurality of removable trays located a predefined adjacent tray positions in said mounting frame each containing a plurality of the aforesaid discrete samples.

4. The device of claim 3 wherein each tray has an identification means, whereby a unique identification may be assigned to each tray.

5. The device of claim 4 wherein each identification means has an identification coded in alphameric form.

6. The device of claim 4, wherein each identification means has an identification coded in machine readable form.

7. The device of claim 6 wherein each identification means is comprised of a plurality of electrical contacts the energized combinations of which provide a unique identifying code, a conductive elastomeric overlay sheet, and a spacing insulating sheet interposed between said conductive overlay sheet and said contacts with perforations defined therein adjacent to said electrical contacts, whereby pressure at selected locations on said conductive overlay sheet adjacent to said perforations in said insulating sheet locally deforms said overlay sheet to close energizing electrical circuits through a selected combination of electrical contacts, and pressure sustaining means for maintaining localized deformation in said overlay sheet.

8. The device of claim 6 further equipped with tray sensor means for detecting the presence of a tray at a position of interest in said mounting frame and logic circuitry is connected to the tray sensor means to direct said detecting head to proceed with sample measurement at the aforesaid position of interest when the presence of a tray is detected at the aforesaid position of interest and to advance to the next tray position upon the failure to detect the presence of a tray at the aforesaid position of interest.

9. The device of claim 3 wherein each tray defines a rectangular matrix of circular openings therein arranged in rows spaced a first uniform distance apart and in columns spaced a second uniform distance apart, and trays having at least two different numbers of columns are positioned in said mounting frame.

10. The device of claim 9 including a tray width detecting means, and detector head logic circuitry adjusts the distance of lateral movement of the detector head perpendicular to said columns in indexing said detector head in response to the tray width detecting means.

11. The device of claim 3 wherein said trays include reference trays containing reference samples followed by unknown sample trays containing unknown samples, and further including operating controls having deactivating means for halting sample measurement and for storing in electronic memory the results of sample measurement of at least the reference samples in at least the last reference sample tray analyzed and for resuming sample measurement when disabled.

12. The device of claim 3 wherein said trays include reference trays containing reference samples followed by unknown sample trays containing unknown samples, and further including operating controls having a deactivating means for halting all mechanical motion, and a restarting means for returning said detector head to the last reference sample tray and for thereupon resuming sample measurement.

13. The device of claim 1 wherein each detector head contains a plurality of photodetectors, whereby radioactivity in a plurality of samples can be measured concurrently.

14. The device of claim 13 wherein each detector head contains three photodetectors with said shielding defining a central vertically aligned aperture assiciated with a central photodetector and further defining flanking apertures extending into said detector head to companion photodetectors at an angle less than 15° with respect to the axis of said central aperture.

15. The device of claim 13 wherein each aperture is provided with a mouth flat flares outward at the surface of the detector head such that the lateral distance between the closest edges of adjacent apertures at the surface of the detector head is no greater than the distance between the centerlines of adjacent samples which are concurrently measured, whereby each mouth guides a sample into the aperture associated therewith as said detector head moves from a lowered to a raised position.

16. The device of claim 13 further comprising a quantity of iodine-125 as a radioactive substance of interest in each of the discrete samples.

17. The device of claim 1 wherein a sample sensing means is located at each aperture in said detector head, and detector head logic circuitry means operates said translation inducing means to return said detector head to the lowered position and to index to the next sequential sample position whenever a predetermined combination of sample sensing means fails to detect a sample when said detector head reaches the aforesaid raised position.

18. The device of claim 1 wherein said trays include reference trays containing reference samples followed by unknown samples trays containing unknown samples, and further including operating controls having an advancing means which, when activated, advances the detector head to the next reference tray.

19. The device of claim 1 including operating controls having cycle control means for recycling the translation inducing means to cause the detector head to automatically, repeatedly traverse the array of samples.

20. The device of claim 1 including operating controls having cycle control means for deactivating the translation inducing means to cause the detector head to cease all motion after traversing the array of samples a single time.

21. In a radiation measuring device for measuring radioactivity in a multiplicity of separate radioactive samples and employing a frame for supporting a multiplicity of samples, and scintillator associated with a sample extending into a sample measuring chamber, a photodetector in optical communication with said scintillator when a sample extends into said sample measuring chamber, and pulse processing means electronically connected to said photodetector, the improvement comprising sample bearing means for supporting said samples with said samples at least partially suspended therefrom at fixed locations in a lateral array, and a movable detector head defining at least one sample measuring chamber in said detector head with an aperture in said detector head leading to each such measuring chamber, and a translation inducing means for moving said detector head vertically between a lowered position below said samples and a raised position in which a portion of at least one sample extends through an aperture into a measuring chamber, and for moving said detector head in the lowered position laterally beneath said samples to traverse the aforesaid array.

22. In a radiation measuring device for measuring a multiplicity of separate radioactive samples and employing a frame for supporting a multiplicity of samples, a scintillator in a sample measuring chamber, a photodetector in optical communication with said scintillator, and pulse processing means electrically connected to said photodetector, the improvement comprising sample bearing means for supporting said samples with said samples at least partially suspended therefrom at fixed locations in a lateral array, and a movable detector head defining at least one sample measuring chamber in said detector head with a passageway in said detector head leading to each such measuring chamber, and a translation inducing means for moving said detector head vertically between a lowered position below said samples and a raised position in which a portion of at least one sample extends through a passageway into a measuring chamber, and for moving said detector head in the lowered position laterally beneath said samples to traverse the aforesaid array.

* * * * *